(12) United States Patent
Albright et al.

(10) Patent No.: US 10,688,977 B2
(45) Date of Patent: *Jun. 23, 2020

(54) BRAKE CONTROL UNIT

(71) Applicant: Horizon Global Americas Inc., Plymouth, MI (US)

(72) Inventors: Marcia Albright, Coldwater, MI (US); Chandrakumar Kulkarni, Battle Creek, MI (US)

(73) Assignee: Horizon Global Americas Inc., Plymouth, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/689,420

(22) Filed: Aug. 29, 2017

(65) Prior Publication Data

US 2018/0009421 A1  Jan. 11, 2018

Related U.S. Application Data

(63) Continuation of application No. 14/330,944, filed on Jul. 14, 2014, now Pat. No. 9,758,138, which is a
(Continued)

(51) Int. Cl.
*B60T 8/32* (2006.01)
*B60T 7/20* (2006.01)
*B60T 8/17* (2006.01)

(52) U.S. Cl.
CPC ........... *B60T 8/323* (2013.01); *B60T 7/20* (2013.01); *B60T 8/1708* (2013.01)

(58) Field of Classification Search
CPC ........ B60T 8/1708; B60T 8/323; B60T 17/22; B60T 7/20; B60T 17/221; B60T 8/248; B60T 8/18
(Continued)

(56) References Cited

U.S. PATENT DOCUMENTS 1,132,294 A    3/1915   Wilkie
2,228,631 A    1/1941   Kuiper
(Continued)

FOREIGN PATENT DOCUMENTS

CA    2157820    3/1996
CA    2201986    10/1997
(Continued)

OTHER PUBLICATIONS

Motorola, Motorola Holster—SYN0718, http://commerce.motorola.com/cgi-bin/ncommerce3/ProductDisplay?prrfnbr=230044&prmenbr=126&accessories_cgrfnbr=22 . . . .
(Continued)

*Primary Examiner* — Bradley T King
*Assistant Examiner* — Mahbubur Rashid
(74) *Attorney, Agent, or Firm* — McDonald Hopkins LLC

(57) ABSTRACT

Towed vehicles can be extremely heavy. Accordingly, it is too much of a burden to the braking system of a towing vehicle to not have brakes on the towed vehicle. Controlling the brakes of the towed vehicle must be accurately applied otherwise very dangerous conditions can be created. A method of controlling braking of a towed vehicle is, therefore, needed. The method comprises receiving speed signals based on speed of a towing vehicle, or a towed vehicle, or both said towing vehicle and said towed vehicle, receiving pressure signals based on pressure of a hydraulic brake system of the towing vehicle, and generating a brake output signal based on the speed signals and the pressure signals.

20 Claims, 4 Drawing Sheets

Related U.S. Application Data continuation of application No. 11/247,010, filed on Oct. 11, 2005, now Pat. No. 8,789,896.

(60) Provisional application No. 60/616,989, filed on Oct. 8, 2004.

(58) Field of Classification Search
USPC .......................................................... 303/123
See application file for complete search history.

(56) References Cited

U.S. PATENT DOCUMENTS

| | | |
|---|---|---|
| 2,870,276 A | 1/1959 | Gelzer |
| 3,015,958 A | 1/1962 | Dove |
| 3,023,626 A | 3/1962 | Bonnell |
| 3,053,348 A | 9/1962 | Stair |
| D199,904 S | 12/1964 | Nunn, Jr. |
| 3,183,512 A | 5/1965 | Castle |
| 3,276,270 A | 10/1966 | Speen |
| 3,354,725 A | 11/1967 | Canfield |
| D215,158 S | 9/1969 | Ozaki |
| 3,497,266 A | 2/1970 | Umpleby |
| 3,501,599 A | 3/1970 | Horecky |
| 3,503,652 A | 3/1970 | Broek |
| 3,519,805 A | 7/1970 | Throne-Booth |
| 3,569,788 A | 3/1971 | Niblack |
| 3,574,414 A | 4/1971 | Jacob |
| 3,598,453 A | 8/1971 | Riordan |
| 3,601,794 A | 8/1971 | Blomenkamp et al. |
| 3,704,670 A | 12/1972 | Dobson et al. |
| 3,710,629 A | 1/1973 | Wojtulewicz |
| 3,730,287 A | 5/1973 | Fletcher et al. |
| 3,738,710 A | 6/1973 | Pokrinchak et al. |
| 3,778,118 A | 12/1973 | Podlewski et al. |
| 3,780,832 A | 12/1973 | Marshall |
| 3,792,250 A | 2/1974 | Kilbourn et al. |
| 3,833,784 A | 9/1974 | Bobel et al. |
| 3,867,844 A | 2/1975 | Shimizu et al. |
| 3,897,979 A | 8/1975 | Vangalis et al. |
| 3,908,782 A | 9/1975 | Lang et al. |
| 3,909,075 A | 9/1975 | Pittet, Jr. et al. |
| 3,953,080 A | 4/1976 | Bremer |
| 3,953,084 A | 4/1976 | Pittet, Jr. et al. |
| 3,955,652 A | 5/1976 | Nilsson et al. |
| 3,964,796 A | 6/1976 | Bremer |
| 3,967,863 A | 7/1976 | Tomecek et al. |
| 3,981,542 A | 9/1976 | Abrams et al. |
| 3,981,544 A | 9/1976 | Tomecek et al. |
| 3,993,362 A | 11/1976 | Kamins et al. |
| 4,030,756 A | 6/1977 | Eden |
| 4,042,810 A | 8/1977 | Mosher |
| 4,043,608 A | 8/1977 | Bourg et al. |
| 4,050,550 A | 9/1977 | Grossner et al. |
| 4,061,407 A | 12/1977 | Snow |
| 4,072,381 A | 2/1978 | Burkhart et al. |
| 4,076,327 A | 2/1978 | Hubbard |
| 4,079,804 A | 3/1978 | Paillard |
| 4,084,859 A | 4/1978 | Bull et al. |
| 4,108,006 A | 8/1978 | Walter |
| 4,122,434 A | 10/1978 | Jensen |
| 4,128,745 A | 12/1978 | Marsilio et al. |
| 4,161,649 A | 7/1979 | Klos et al. |
| 4,196,936 A | 4/1980 | Snyder |
| D257,972 S | 1/1981 | Freehauf et al. |
| D257,973 S | 1/1981 | Reid |
| 4,277,895 A | 7/1981 | Wiklund |
| 4,295,687 A | 10/1981 | Becker et al. |
| 4,316,067 A | 2/1982 | Whiteman, Jr. |
| 4,336,592 A | 6/1982 | Beck |
| D266,501 S | 10/1982 | Stefanik |
| 4,386,427 A | 5/1983 | Hosaka |
| 4,398,252 A | 8/1983 | Frait |
| 4,402,047 A | 8/1983 | Newton et al. |
| 4,404,619 A | 9/1983 | Ferguson |
| 4,414,848 A | 11/1983 | Shutt |
| 4,419,654 A | 12/1983 | Funk |
| 4,445,376 A | 5/1984 | Merhav |
| D275,973 S | 10/1984 | Marino |
| 4,550,372 A | 10/1985 | Kahrs |
| 4,586,138 A | 4/1986 | Mullenhoff et al. |
| 4,587,655 A | 5/1986 | Hirao et al. |
| 4,624,506 A | 11/1986 | Doto |
| 4,660,418 A | 4/1987 | Greenwood et al. |
| 4,665,490 A | 5/1987 | Masaki et al. |
| 4,681,991 A | 7/1987 | Anderson |
| 4,721,344 A | 1/1988 | Frait et al. |
| 4,722,576 A | 2/1988 | Matsuda |
| 4,726,627 A | 2/1988 | Frait et al. |
| 4,768,840 A | 9/1988 | Sullivan et al. |
| 4,836,616 A | 6/1989 | Roper et al. |
| 4,845,464 A | 7/1989 | Drori et al. |
| 4,849,655 A | 7/1989 | Bennett |
| 4,850,656 A | 7/1989 | Ise et al. |
| 4,852,950 A | 8/1989 | Murakami |
| 4,856,850 A | 8/1989 | Aichele et al. |
| 4,872,099 A | 10/1989 | Kelley et al. |
| 4,905,518 A | 3/1990 | Kubler |
| 4,928,084 A | 5/1990 | Reiser |
| D308,666 S | 6/1990 | Oesterheld et al. |
| D315,216 S | 3/1991 | Kelley et al. |
| 5,002,343 A | 3/1991 | Brearley et al. |
| D316,399 S | 4/1991 | Wharton |
| 5,016,898 A | 5/1991 | Works et al. |
| 5,032,821 A | 7/1991 | Domanico et al. |
| D319,423 S | 8/1991 | Karczewski et al. |
| 5,044,697 A | 9/1991 | Longyear et al. |
| 5,050,937 A | 9/1991 | Eccleston |
| 5,050,938 A | 9/1991 | Brearley et al. |
| 5,050,940 A | 9/1991 | Bedford et al. |
| 5,058,960 A | 10/1991 | Eccleston et al. |
| D322,426 S | 12/1991 | Austin |
| D323,136 S | 1/1992 | Chase et al. |
| 5,080,445 A | 1/1992 | Brearley et al. |
| D326,926 S | 6/1992 | Stephenson et al. |
| 5,139,315 A | 8/1992 | Walenty et al. |
| 5,142,473 A | 8/1992 | Davis |
| 5,149,176 A | 9/1992 | Eccleston |
| D331,226 S | 11/1992 | Austin |
| D334,733 S | 4/1993 | Morgan et al. |
| 5,226,700 A | 7/1993 | Dyer |
| 5,242,215 A | 9/1993 | Krause |
| 5,255,962 A | 10/1993 | Neuhaus et al. |
| 5,322,255 A | 6/1994 | Garrett |
| 5,333,948 A | 8/1994 | Austin et al. |
| D351,141 S | 10/1994 | Van Akkeren et al. |
| 5,352,028 A | 10/1994 | Eccleston |
| 5,355,717 A | 10/1994 | Tanaka et al. |
| 5,389,823 A | 2/1995 | Hopkins et al. |
| D365,298 S | 3/1995 | Austin |
| 5,398,901 A | 3/1995 | Brodmann et al. |
| 5,423,601 A | 6/1995 | Sigl |
| 5,446,657 A | 8/1995 | Ikeda et al. |
| D362,659 S | 9/1995 | Hedding et al. |
| D363,999 S | 11/1995 | Taylor et al. |
| 5,487,305 A | 1/1996 | Ristic et al. |
| 5,487,598 A | 1/1996 | Rivard et al. |
| 5,498,910 A | 3/1996 | Hopkins et al. |
| D369,224 S | 4/1996 | Karlo et al. |
| 5,510,989 A | 4/1996 | Zabler et al. |
| D370,448 S | 6/1996 | McCoy et al. |
| 5,549,364 A | 8/1996 | Mayr-Frohlich et al. |
| 5,571,023 A | 11/1996 | Anthony |
| 5,575,543 A | 11/1996 | Pheonix |
| D376,437 S | 12/1996 | Karlo et al. |
| D376,576 S | 12/1996 | Pratt |
| 5,581,034 A | 12/1996 | Dao et al. |
| 5,587,865 A | 12/1996 | Bielig et al. |
| 5,606,308 A | 2/1997 | Pinkowski |
| D378,511 S | 3/1997 | Austin |
| 5,615,930 A | 4/1997 | McGrath et al. |
| 5,620,236 A | 4/1997 | McGrath et al. |
| 5,648,755 A | 7/1997 | Yagihashi |
| 5,649,749 A | 7/1997 | Kullmann et al. |
| D388,523 S | 12/1997 | Austin |

(56) References Cited

U.S. PATENT DOCUMENTS

| | | |
|---|---|---|
| 5,700,068 A | 12/1997 | Austin |
| 5,706,909 A | 1/1998 | Bevins et al. |
| 5,719,333 A | 2/1998 | Hosoi et al. |
| D392,604 S | 3/1998 | Wright et al. |
| 5,738,363 A | 4/1998 | Larkin |
| 5,741,048 A | 4/1998 | Eccleston |
| D394,626 S | 5/1998 | Sacco et al. |
| 5,770,999 A | 6/1998 | Rhodes |
| 5,782,542 A | 7/1998 | McGrath et al. |
| 5,785,393 A | 7/1998 | McGrath et al. |
| 5,800,025 A | 9/1998 | McGrath et al. |
| D399,187 S | 10/1998 | Kay |
| 5,832,840 A | 11/1998 | Woof |
| D404,365 S | 1/1999 | Robertson et al. |
| 5,890,084 A | 3/1999 | Halasz et al. |
| D407,694 S | 4/1999 | Hill et al. |
| D408,773 S | 4/1999 | Blanchard |
| 5,893,575 A | 4/1999 | Larkin |
| D411,829 S | 7/1999 | Pancheri et al. |
| 5,949,147 A | 9/1999 | McGrath et al. |
| 5,951,122 A | 9/1999 | Murphy |
| D418,098 S | 12/1999 | Wallace |
| D418,822 S | 1/2000 | Worley et al. |
| 6,012,780 A | 1/2000 | Duvernay |
| 6,039,410 A | 3/2000 | Robertson et al. |
| 6,052,644 A | 4/2000 | Murakami et al. |
| 6,068,352 A | 5/2000 | Kulkarni et al. |
| 6,100,943 A | 8/2000 | Koide et al. |
| 6,122,568 A | 9/2000 | Madau et al. |
| 6,126,246 A | 10/2000 | Decker, Sr. et al. |
| 6,131,457 A | 10/2000 | Sato |
| D433,387 S | 11/2000 | Roth et al. |
| D434,011 S | 11/2000 | Roth et al. |
| D434,391 S | 11/2000 | Roth et al. |
| D434,392 S | 11/2000 | Reichard |
| D435,494 S | 12/2000 | Reichard |
| D436,932 S | 1/2001 | Roth et al. |
| 6,175,108 B1 | 1/2001 | Jones et al. |
| 6,177,865 B1 | 1/2001 | Bryant et al. |
| 6,179,390 B1 * | 1/2001 | Guzorek ............... B60T 7/042 188/3 R |
| 6,201,284 B1 | 3/2001 | Hirata et al. |
| 6,232,722 B1 | 5/2001 | Bryant et al. |
| 6,234,584 B1 | 5/2001 | Stumpe et al. |
| 6,263,733 B1 | 7/2001 | Reimer et al. |
| 6,273,522 B1 | 8/2001 | Feetenby et al. |
| 6,282,480 B1 | 8/2001 | Morse et al. |
| 6,286,911 B1 | 9/2001 | Wright et al. |
| 6,299,102 B2 | 10/2001 | Happ |
| 6,308,134 B1 | 10/2001 | Croyle et al. |
| D450,661 S | 11/2001 | Weisz et al. |
| D451,611 S | 12/2001 | Pontarolo |
| 6,325,466 B1 | 12/2001 | Robertson et al. |
| 6,364,432 B1 | 4/2002 | Mixon |
| 6,367,588 B1 | 4/2002 | Robertson et al. |
| 6,371,572 B1 | 4/2002 | Frank |
| 6,405,592 B1 | 6/2002 | Murari et al. |
| 6,419,055 B1 | 7/2002 | Walsh et al. |
| 6,445,993 B1 | 9/2002 | Eccleston et al. |
| 6,466,821 B1 | 10/2002 | Pianca et al. |
| 6,499,814 B1 | 12/2002 | Mixon |
| D468,273 S | 1/2003 | Reichard |
| D468,704 S | 1/2003 | Reichard |
| D468,705 S | 1/2003 | Reichard |
| 6,516,925 B1 | 2/2003 | Napier et al. |
| 6,520,528 B2 | 2/2003 | Fandrich et al. |
| 6,532,419 B1 | 3/2003 | Begin et al. |
| 6,557,952 B1 | 5/2003 | Robertson et al. |
| D477,553 S | 7/2003 | Brock et al. |
| 6,609,766 B1 | 8/2003 | Chesnut |
| 6,615,125 B2 | 9/2003 | Eccleston et al. |
| 6,619,759 B2 | 9/2003 | Bradsen et al. |
| 6,626,504 B2 | 9/2003 | Harner et al. |
| 6,634,466 B1 | 10/2003 | Brock et al. |
| 6,652,038 B1 | 11/2003 | Frye |
| 6,655,752 B2 | 12/2003 | Robertson et al. |
| 6,666,527 B2 | 12/2003 | Gill et al. |
| 6,668,225 B2 | 12/2003 | Oh et al. |
| 6,685,281 B2 | 2/2004 | MacGregor et al. |
| D488,370 S | 4/2004 | Sivertsen |
| D490,349 S | 5/2004 | Brock et al. |
| 6,752,474 B1 | 6/2004 | Olberding et al. |
| D494,547 S | 8/2004 | Smith et al. |
| 6,802,572 B2 | 10/2004 | Lamke et al. |
| 6,802,725 B2 | 10/2004 | Rowland et al. |
| D498,190 S | 11/2004 | Brock et al. |
| 6,837,551 B2 | 1/2005 | Robinson et al. |
| 6,845,851 B1 | 1/2005 | Donaldson et al. |
| 6,849,910 B2 | 2/2005 | Oberhardt et al. |
| 6,891,468 B2 | 5/2005 | Koenigsberg et al. |
| 6,918,466 B1 | 7/2005 | Decker, Jr. et al. |
| D509,959 S | 9/2005 | Nykoluk |
| 6,966,613 B2 | 11/2005 | Davis |
| D513,171 S | 12/2005 | Richardson |
| 7,021,723 B1 | 4/2006 | Kaufman |
| D522,041 S | 5/2006 | Sewell |
| D523,803 S | 6/2006 | Smith et al. |
| 7,058,499 B2 | 6/2006 | Kissel |
| D527,710 S | 9/2006 | Smith et al. |
| 7,168,531 B2 | 1/2007 | Navarro |
| 7,204,564 B2 | 4/2007 | Brown et al. |
| D542,745 S | 5/2007 | Barnes, Jr. et al. |
| D551,139 S | 9/2007 | Barnes et al. |
| 7,273,260 B2 | 9/2007 | Gray |
| 7,311,364 B2 | 12/2007 | Robertson |
| 7,347,507 B1 | 3/2008 | Stillinger |
| D581,356 S | 11/2008 | Ahlgren |
| D584,695 S | 1/2009 | Hilsbos et al. |
| D593,507 S | 6/2009 | Svoboda et al. |
| D598,395 S | 8/2009 | Hilsbos et al. |
| 7,575,286 B2 | 8/2009 | Robertson |
| D603,808 S | 11/2009 | Svoboda et al. |
| D619,542 S | 7/2010 | Svoboda et al. |
| 8,145,402 B2 | 3/2012 | Craig |
| 8,165,768 B2 | 4/2012 | Leschuk et al. |
| 8,180,546 B2 | 5/2012 | Culbert et al. |
| 8,430,458 B2 | 4/2013 | Kaminski et al. |
| 8,442,797 B2 | 5/2013 | Kim et al. |
| 8,651,585 B2 | 2/2014 | Kaminski et al. |
| 8,700,285 B2 | 4/2014 | Barlsen et al. |
| 8,746,812 B2 | 6/2014 | Albright et al. |
| 8,789,896 B2 | 7/2014 | Albright et al. |
| 2001/0038239 A1 | 11/2001 | Ehrlich et al. |
| 2002/0003571 A1 | 1/2002 | Schofield et al. |
| 2002/0038974 A1 | 4/2002 | Lamke et al. |
| 2002/0047684 A1 | 4/2002 | Robertson et al. |
| 2002/0082750 A1 | 6/2002 | Lamke et al. |
| 2002/0095251 A1 | 7/2002 | Oh et al. |
| 2002/0123837 A1 | 9/2002 | Eccleston et al. |
| 2002/0180257 A1 | 12/2002 | Gill et al. |
| 2003/0025597 A1 | 2/2003 | Schofield |
| 2003/0038534 A1 | 2/2003 | Barnett |
| 2003/0042792 A1 | 3/2003 | Reinold et al. |
| 2003/0098610 A1 | 5/2003 | Bradsen et al. |
| 2003/0168908 A1 | 9/2003 | Robinson et al. |
| 2004/0026987 A1 | 2/2004 | Davis |
| 2004/0174141 A1 | 9/2004 | Luz et al. |
| 2004/0245849 A1 | 12/2004 | Kissel |
| 2005/0035652 A1 | 2/2005 | Roll et al. |
| 2005/0077780 A1 | 4/2005 | Robertson |
| 2005/0127747 A1 | 6/2005 | Robertson |
| 2006/0033308 A1 * | 2/2006 | Waldbauer ............... B60D 1/32 280/455.1 |
| 2006/0076827 A1 | 4/2006 | Albright et al. |
| 2006/0176166 A1 | 8/2006 | Smith et al. |
| 2006/0214506 A1 | 9/2006 | Albright et al. |
| 2007/0024107 A1 | 2/2007 | Marsden et al. |
| 2007/0114836 A1 | 5/2007 | Kaminski et al. |
| 2007/0222283 A1 | 9/2007 | Skinner et al. |
| 2008/0309156 A1 | 12/2008 | Kissel |
| 2010/0152920 A1 | 6/2010 | McCann |
| 2010/0152989 A1 | 6/2010 | Smith et al. |

(56) References Cited

U.S. PATENT DOCUMENTS

2010/0222979 A1 9/2010 Culbert et al.
2014/0103619 A1 4/2014 Motts et al.

FOREIGN PATENT DOCUMENTS

| CA | 2324091 | 4/2001 |
| CA | 109867 | 8/2006 |
| EP | 0334412 | 9/1989 |
| WO | WO97/07003 | 2/1997 |
| WO | 2003018380 | 3/2003 |

OTHER PUBLICATIONS

Service Manual 440-1002 for Carlisle Electric Brake Actuator Kit, Carlisle Industrial Brake and Friction, pp. 1-8.
Electronic Brake Control for 2, 4, 6 and 8 brake applications manual, 2007, Cequent Electrical Products, 9 pgs.
Hayes Lemmerz—Energize III—Brake Controller, http://aftermarket.hayes-lemmerz.comi/html/energize_iii.html.
Hayes Lemmerz—Endeavor—Brake Controller, http://aftermarket.hayes-lemmerz.com/html/endeavor.html.
Hayes Lemmerz—Energize XPC—Brake Controller, http://.aftermarket.hayes-lemmerz.com/html/energize_xpc.html.
Dexter Axle—Predator DX2 Controller (058-008-00)—Brake Controller, http://www.dexteraxle.com/inc/pdetail?v=1&pid=1759.
Tekonsha—AccuPower AccuTrac Inertia Brake Control, 1 to 2 Axle Brake System, Model #80510, http://www.tekonsha.com/accuarac.html.
Tekonsha—AccuPower AccuPower DigiTrac II Inertia Brake Control, 1 to 4 Axle Brake Systems, Model #80750, http://www.tekonsha.com/digitrac.html.
Tekonsha—Voyager, Proporational Brake Control, 1 to 4 Axle Brake Systems, Model #9030, http://www.tekonsha.com/tevoyagerintro.html.
Sample of Applicant's products, http://www.hiddenhitch.com/Products/DisplayAccessory.asp?AccessoryID=39503; and39510.
Sample of Applicant's products, http://www.hiddenhitch.com/Products/DisplayAccessory.asp?AccessoryID=39517; and39514.
Surface Vehicle Recommended Practice. Society of Automotive Engineers, Inc., 2002.

* cited by examiner

BRAKE CONTROL UNIT

CROSS-REFERENCE TO RELATED APPLICATION

This application is a continuation of U.S. patent application Ser. No. 14/330,944, filed on Jul. 14, 2014, entitled "Brake Control Unit," which is a continuation of U.S. patent application Ser. No. 11/247,010 filed on Oct. 11, 2005, now U.S. Pat. No. 8,789,896, which claims priority to U.S. Provisional Patent Application No. 60/616,989 filed on Oct. 8, 2004, which are all hereby incorporated by reference in their entirety.

FIELD OF THE INVENTION

The present invention is generally related to a brake control unit, and more particularly to a brake control unit for providing a brake output signal to brakes of a towed vehicle.

BACKGROUND OF THE INVENTION

A variety of prior art brake control units that provide a brake output signal to brakes of a towed vehicle, such as a trailer, have been proposed and/or manufactured. A number of proposed brake control units have included a brake signal generator, e.g., a deceleration sensor, whose output has been utilized to determine a magnitude for the brake output signal. In general, these brake control units have proposed utilization of a signal provided by a component, located within a towing vehicle, to determine a magnitude for a brake output signal that is provided to brakes of a towed vehicle to initiate braking of the towed vehicle. However, disclosures associated with such proposed brake control units have not disclosed how certain signals present on various automotive communication buses could be utilized to control and/or optimize control of brakes of a towed vehicle. In particular, how speed signals can be used to control and/or optimize control of the brakes of the towed vehicle.

When towed vehicles are traveling at slower speeds, the electric brakes used to stop or slow down such towed vehicles are often too aggressive causing significant jerking, or in the worst case, locking of the brakes of the towed vehicle. What is needed, therefore, is a brake control unit that is capable of applying a brake output signal to brakes of a towed vehicle that may be based on both a speed of a towing vehicle and a signal corresponding to the braking effort applied by the driver of the towing vehicle, such as hydraulic pressure of a hydraulic brake system of the towing vehicle. This would, therefore, permit the brake control unit to reduce power to the towed vehicle brakes when it is traveling at low speeds.

Further, it would be desirable for the brake control unit to determine certain towed vehicle characteristics based on both a speed of a towing vehicle and a change in the speed of the towing vehicle or towed vehicle measured over a specific time period based on a known braking effort. In addition, it would be desirable for the brake control unit to create a real-time brake output signal based on estimated driving conditions to compensate for variations in brakes of a towed vehicle that are attributable to a current speed of the towed vehicle.

Additionally, it would be desirable for the brake control unit to automatically adjust the maximum magnitude of the brake output signal and/or provide a modified initial brake output signal and/or a modified slew rate of the brake output voltage, e.g., set a gain level and/or boost level. Finally, it would be desirable for the brake control unit to determine a towed vehicle characteristic based upon an actual deceleration of a towed vehicle in response to a known output signal.

SUMMARY OF THE INVENTION

An embodiment of the present invention is directed to a method of controlling braking of a towed vehicle. The method comprises receiving a speed signal based on speed of a towing vehicle, or a towed vehicle, or both the towing vehicle and the towed vehicle, receiving a pressure signal based on pressure of a brake system of the towing vehicle, and generating a brake output signal based on the speed signal and the pressure signal.

According to another embodiment of the present invention, a method for controlling braking of a towed vehicle is disclosed. The method compromises periodically receiving speed signals based on speed of a towing vehicle, or a towed vehicle, or both the towing vehicle and the towed vehicle, providing a brake output signal to brakes of the towed vehicle, estimating towing conditions of the towed vehicle based on changes in the received speed signals attributable to the brake output signal, and modifying the brake output signal based on the estimated towing conditions to compensate for variations in the brakes of the towed vehicle.

In yet another embodiment of the present invention, a method for controlling braking of a towed vehicle comprises periodically receiving speed signals based on speed of a towing vehicle, or a towed vehicle, or both the towing vehicle and the towed vehicle, increasing power supplied by a brake output signal, e.g., a variable pulse width brake output signal, to brakes of the towed vehicle until a preset threshold deceleration is achieved for the towed vehicle, determining reduction in the speed signals over a fixed time period, determining a braking power at which the preset threshold deceleration is achieved, and determining characteristics of the towed vehicle based on the reduction in the speed.

According to yet another embodiment of the present invention, a method of controlling braking of a towed vehicle comprises receiving speed signals based on speed of a towing vehicle, or a towed vehicle, or both the towing vehicle and the towed vehicle, generating a brake output signal based on the received speed signals, the brake output signal being capable of being sent to the brakes of the towed vehicle, determining actual deceleration of the towed vehicle attributable to the brake output signal, and determining characteristics of the towed vehicle based upon the actual deceleration of the towed vehicle.

According to yet another embodiment of the present invention, a method of controlling braking of a towed vehicle comprises periodically receiving speed signals based on speed of a towing vehicle, or a towed vehicle, or both the towing vehicle and the towed vehicle, estimating a gain setting of said towed vehicle based on the speed signals, and determining a maximum braking power before the wheels of the towed vehicle lock up under prevailing conditions of the towed vehicle based on the estimated gain setting.

According to another embodiment of the present invention a method of controlling braking of a towed vehicle comprises determining deceleration of at least one of a towed vehicle, or a towing vehicle, or both the towing vehicle and the towed vehicle, determining characteristics of said towed vehicle based upon said deceleration of said towed vehicle, and modulating a brake output signal to periodically release and engage brakes of said towed vehicle, wherein the brake output signal is based on the characteristics of the towed vehicle.

According to another embodiment of the present invention a method of controlling braking of a towed vehicle comprises determining acceleration of a towed vehicle perpendicular to direction of travel of said towed vehicle, and modulating a brake output signal to periodically release and engage brakes of said towed vehicle based on said perpendicular acceleration.

According to yet another embodiment of the present invention a method of controlling braking of a towed vehicle comprises receiving a deceleration signal based on deceleration of at least one of a towed vehicle, or a towing vehicle, or both the towing vehicle and the towed vehicle, increasing power supplied by a brake output signal to brakes of said towed vehicle until a present threshold deceleration is achieved for said towed vehicle, determining a braking power at which the preset threshold deceleration is achieved, and determining characteristics of the towed vehicle based on the deceleration.

These and other features, advantages and objects of the present invention will be further understood and appreciated by those skilled in the art by reference to the following specification, claims, and appended drawings.

DETAILED DESCRIPTION

A brake control unit, according to an embodiment of the present invention, includes a processor and a memory subsystem. The brake control unit is typically located within a passenger compartment of a towing vehicle, and may even be integrated with the towing vehicle. For example, the brake control unit may be integrated in the dash of the towing vehicle. The processor is programmed to provide a brake output signal to brakes or brake load, e.g., electromagnetic brakes, of a towed vehicle responsive to one or more input signals, e.g., speed signals and pressure signals, that are provided by one or more automotive subsystems of the towing vehicle. The automotive subsystems may be coupled to the processor via an analog interface, a parallel bus, or a serial communication bus, e.g., a controlled area network or high-speed controlled area network (CAN) bus. Alternatively, the input signals may be provided by an automotive subsystem located on a towed vehicle or automotive subsystems located both on the towing vehicle and the towed vehicle. Irrespective of the location of the automotive subsystem(s), the processor executes a routine to analyze the input signal(s) to determine certain characteristics of the towing and/or towed vehicle, e.g., deceleration of a towing vehicle and, in turn, deceleration of a towed vehicle. This provides the ability of electric trailer brakes to achieve a desired deceleration that is highly dependent upon an initial speed and load of an associated towed vehicle. Thus, a brake output signal may be tailored for a given initial towed vehicle speed and load, as well as road conditions to more readily achieve a desired deceleration.

The processor is also coupled to the memory subsystem that stores various routines that allow the processor to perform various functions, e.g., automatically adjusting the maximum magnitude of the brake output signal and/or providing an increased initial brake output signal (such as setting a gain and/or a boost function of the brake control unit) and to communicate with the automotive subsystem(s). The brake control unit may also include a display, such as a dual seven-segment display, that provides status and diagnostic information to an operator of the towing vehicle.

The brake control unit may also provide a proportional brake output signal to the brakes when the towing vehicle is backing-up or a fixed brake output signal when the towed vehicle is completely stopped with the brake pedal depressed, e.g., on an incline. The brakes of the towing vehicle, therefore, are not required to stop or hold the towed vehicle when the towing vehicle is backing-up or is stopped on an incline.

Figure 1:
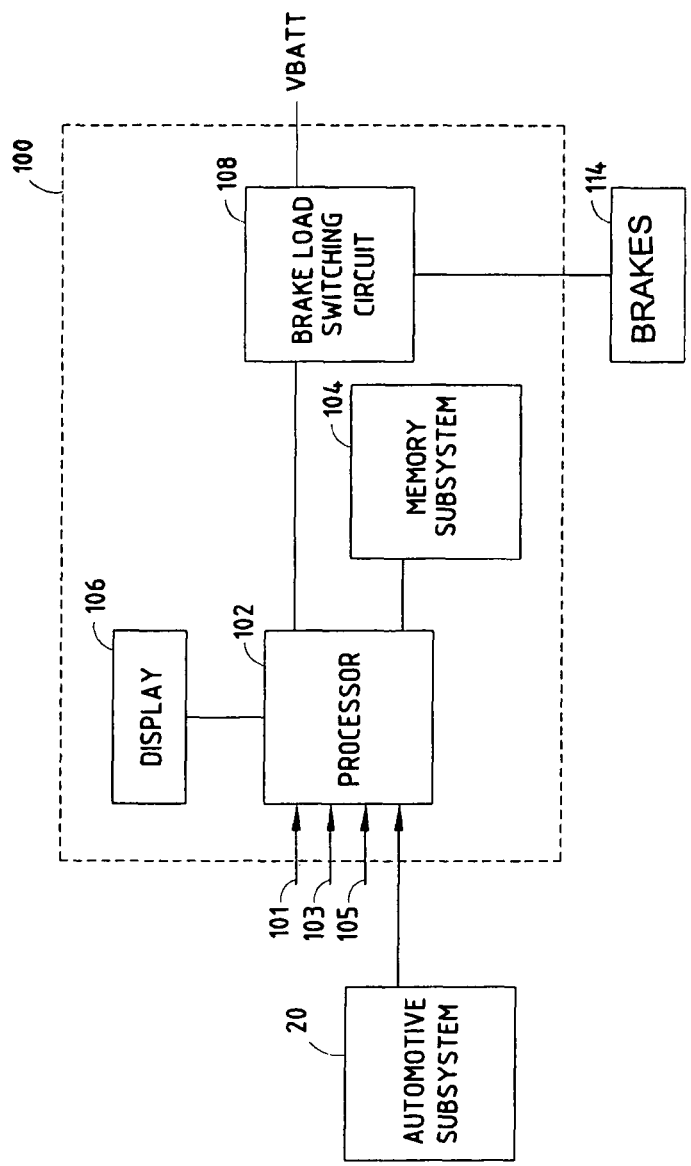
FIG. 1 is an exemplary electrical block diagram of a brake control unit, according to an embodiment of the present invention.

As shown in FIG. 1, a brake control unit 100 includes a processor 102 coupled to a memory subsystem 104, a display 106, an automotive subsystem 20, and a brake switching circuit 108. As used herein, the term "processor" may include a general purpose processor, a microcontroller, e.g., an execution unit with memory, etc., integrated within an integrated circuit, a digital signal processor (DSP), a programmable logic device (PLD), or an application specific integrated circuit (ASIC), among other such processing devices. The processor 102 may receive a manual input signal 101, a gain input signal 103, and/or a boost input toggle signal 105, among other input signals (not specifically shown in FIG. 1).

A spring-biased wiper of a potentiometer coupled between a supply voltage, e.g., derived from a vehicle battery VBATT, and ground may provide the manual input signal 101 to the manual input of the processor 102. It should be understood, however, that any other manual input device can be used. This allows an operator of the towing vehicle to apply a brake output signal to the brakes 114 of the towed vehicle without engaging the brakes of the towing vehicle. Similarly, a wiper of a rotary potentiometer coupled between a supply voltage, e.g., derived from a vehicle battery VBATT, and ground may provide the gain input signal 103 to a gain input of processor 102. Again, it should be understood that any other manual input device can be used. The gain input signal 103 allows an operator of the towing vehicle to adjust the maximum magnitude, e.g., the duty cycle, of the brake output signal provided, via the brake load switching circuit 108, to the brake load 114, e.g., brake electromagnets, of the towed vehicle.

According to one embodiment of the present invention, a boost switch coupled to a boost input of the processor 102, when actuated, causes the processor 102 to toggle between normal operation and providing an increased initial brake output signal to the brake load 114 of the towed vehicle. When a boost switch (SW1, see FIG. 2A) toggles the boost on, the processor 102 provides an initial brake output signal equal to a fraction of the maximum brake output signal currently set by the gain input signal 103. The boost switch may allow the operator to add an additional brake output signal at the start of a braking event to compensate for different towed vehicles, towed vehicle weight, or other different braking conditions, e.g., wet or dry road conditions. The boost switch may also be used to modify the transfer function of the brake control unit. This provides a faster slew rate of the output, which is especially useful for heavier towed vehicles. The boost switch allows the operator of the towing vehicle to provide a more aggressive brake setting when the brake control unit is utilized with, e.g., heavy multi-axle trailers. Alternatively, a variable boost, e.g., set with a potentiometer, or incrementally stepped values can be employed.

The display 106 may take the form of a dual seven-segment display that provides information to the operator of the vehicle in the form of alphanumeric characters, or any other configuration. As mentioned above, the automotive subsystem 20 provides an input signal to the processor 102 that the processor 102 utilizes in determining a magnitude for the brake output signal that is applied to the brakes 114 of the towed vehicle. As mentioned above, the brake output signal is applied by the brake switching circuit 108, of which one embodiment is further described below in conjunction with FIGS. 2A-2B. The automotive subsystem 20 may take various forms, e.g., a global positioning system (GPS) receiver, a wheel speed sensor, an engine speed sensor, a throttle position sensor, a Doppler sensor, etc. The automotive subsystem 20 may be located within the towed vehicle, the towing vehicle, or within a combination of the towing and towed vehicles when multiple automotive subsystems are used to provide multiple input signals.

Figure 2A:
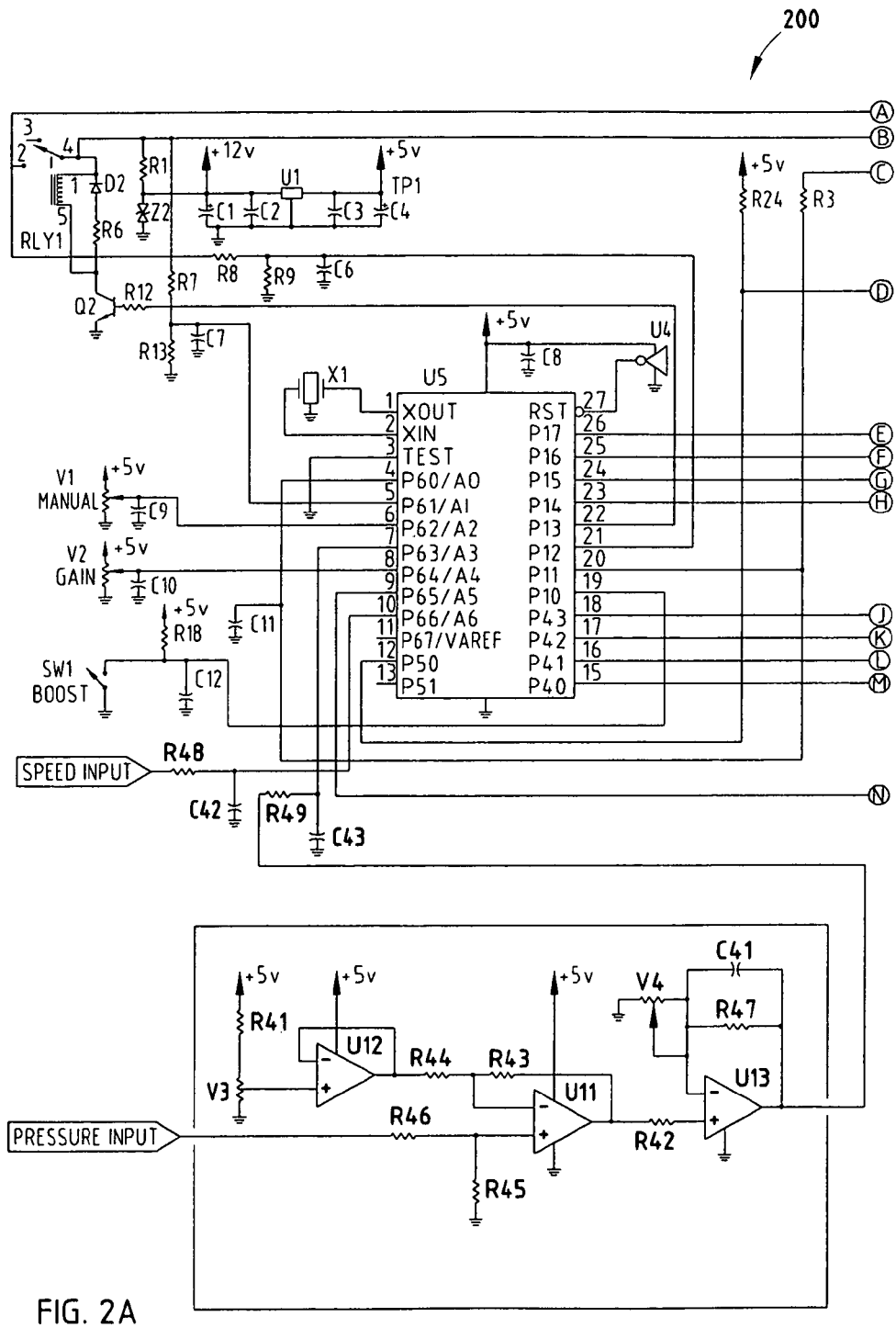
FIGS. 2A-2B are an exemplary electrical schematic diagram of a brake control unit, according to an embodiment of the present invention.
Figure 2B:
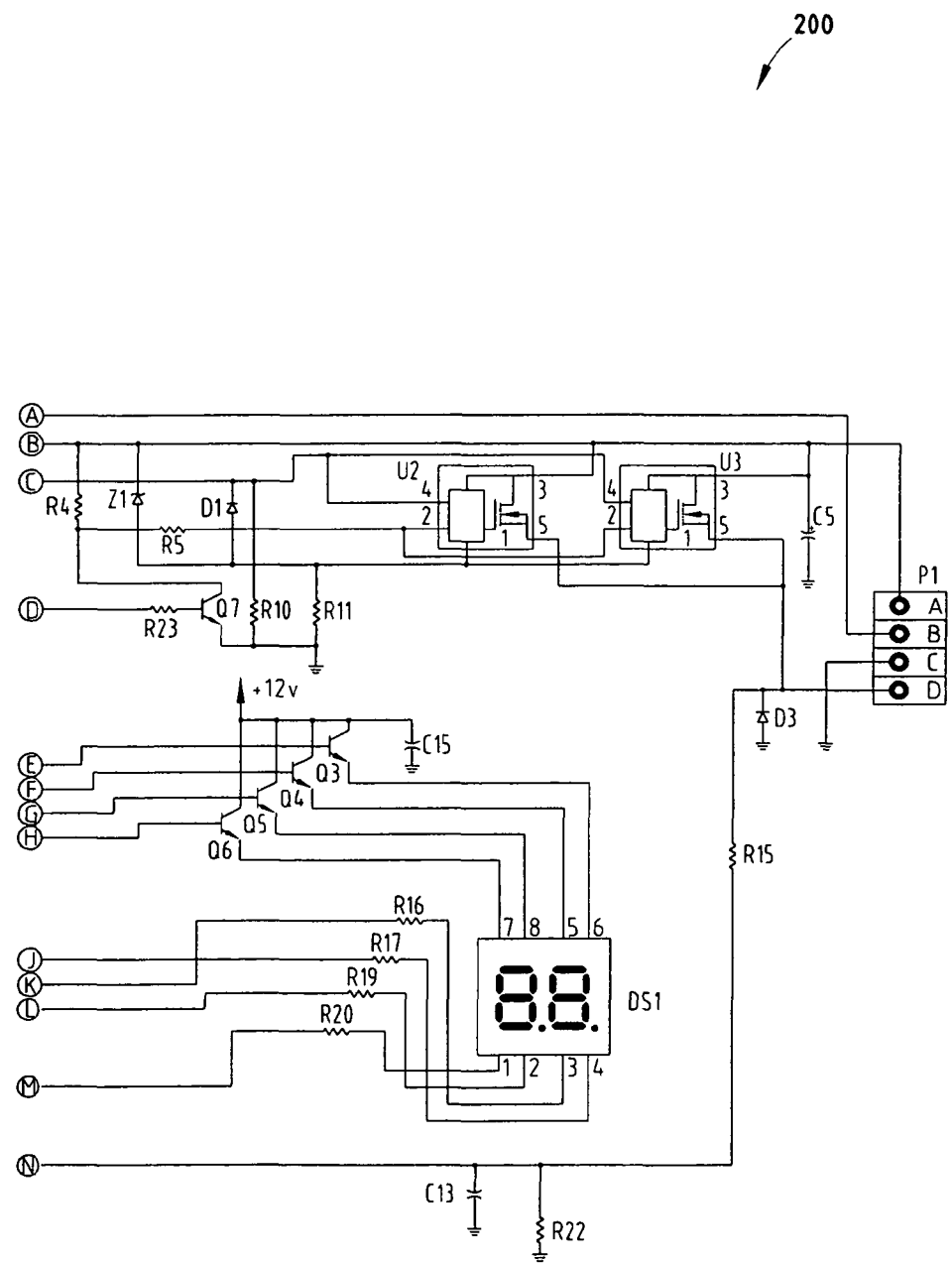

Moving to FIGS. 2A-2B, an exemplary electrical schematic of a brake control unit 200 is illustrated, according to one embodiment of the present invention. In the embodiment of FIGS. 2A-2B, the processor 102 and the memory subsystem 104, of FIG. 1, are implemented as a microcontroller U5. The microcontroller U5 may receive a manual input signal (on pin 6) from a manual control, e.g., potentiometer, V1 and a gain input signal (on pin 8) from a gain control, e.g., a potentiometer V2. When a boost switch SW1 is present and asserted, a boost input toggle signal, as described above, may be received on pin 19 of the microcontroller U5. A suitable microcontroller is manufactured and made commercially available by Toshiba Corporation (part no. TMP87C809). The TMP87C809 includes 8 K of internal read-only memory (ROM), two hundred fifty-six bytes of internal random access memory (RAM), six internal LED drivers, eight ten-bit analog-to-digital (A/D) converter channels, one sixteen-bit timer/counter, two eight-bit timer/counters and twenty-two I/O ports. Alternatively, other microcontrollers having communication bus interface capabilities, such as CAN interface capabilities, may be used to interface with the towing vehicle bus.

In operation, the microcontroller U5 monitors the towing vehicle stoplight switch (via connector P1, pin B) on pin 21 (via a divider/filter network including a resistor R8, a resistor R9 and a capacitor C6, whose values are, for example, 10 kΩ, 22 kΩ and 0.1 µF, respectively) to determine whether to implement various stored routines. The microcontroller U5 monitors the brake output signal (provided to the brakes via connector P1, pin D and pin C (ground)) on pin 9 via a divider/filter network including a resistor R15, a resistor R22, and a capacitor C13, whose values are, for example, 22 kΩ, 10 kΩ and 4.7 µF, respectively.

The microcontroller U5 is programmed to periodically determine the speed of the towing vehicle by reading an analog level of a signal at pin 10, via a filter network including resistor R48 and capacitor C42, whose values are, e.g., 10 l Ω and 4.7 µF, respectively. Alternatively, the speed may take the form of a digital signal and be provided to a serial port of the microcontroller U5 or may be provided via the towing vehicle communication bus, such as a CAN or a local interconnect network (LIN). In either case, the microcontroller U5 implements an algorithm that periodically reads a speed input (or an input from which the speed can be derived). The speed input is used, at least in part, to determine a magnitude for a current brake output signal, e.g., a duty cycle of the brake output signal, when a brake pedal of the towing vehicle is depressed.

A change in the input signal, in general, indicates vehicle acceleration or deceleration in either a forward or reverse direction (when backing-up). When the microcontroller U5 determines that the current input signal(s) indicates the towing vehicle is not accelerating or decelerating, the microcontroller U5 causes a brake output signal to be applied to the brakes if the stop light switch is activated. When the microcontroller U5 determines that the speed input is not changing and that the stop light switch is still engaged, the microcontroller U5 causes the brake output signal to ramp up to a voltage that is a fixed percentage of a power control set point (set by the gain potentiometer V2, when implemented) after about four seconds, which produces a brake output signal during stopped or static conditions. Alternatively, the gain control may be implemented using push button switch(es) and a display.

When the vehicle is stopped and the boost is on, the brake output voltage immediately steps to a fixed percent, e.g., twenty-five percent, of the power control set point. In one embodiment, when the boost switch SW1 is pressed during the ramp function, the boost switch SW1 takes priority and the output voltage immediately changes to twenty-five percent of the power control set point.

The microcontroller U5 may also receive another input signal, e.g., a pressure input, on pin 7. The microcontroller U5 may utilize the pressure input in conjunction with the speed input to determine a magnitude for a brake output signal that is to be applied to the brakes of a towed vehicle, as is further discussed below. As is shown in FIG. 2A, the analog pressure input signal is applied to a non-inverting input of an operational amplifier U11 via a divider network that includes a resistor R46 and a resistor R45, whose values are, e.g., 11 kΩ and 10 kΩ, respectively. A resistor R43, whose value is, e.g., 10 kΩ, is coupled between an inverting input and output of the amplifier U11.

An output of a unity gain operational amplifier U12 is coupled to the inverting input of the amplifier U11 via a resistor R44, whose value is, e.g., 11 kΩ. A non-inverting input of the amplifier U12 is coupled to a wiper of a potentiometer V3 (e.g., 5 kΩ) that is coupled between ground and to a positive voltage supply (e.g., +5 volts) via a resistor R41, whose value is, e.g., 21 kΩ. The output of the amplifier U11 is coupled to a non-inverting input of an operational amplifier U13 via a resistor R42, whose value is, e.g., 10 kΩ.

A potentiometer V4 (e.g., 50 kΩ) is coupled between ground and an inverting input of the amplifier U13, with a wiper of the potentiometer V4 being coupled to the inverting input of the amplifier U13. A filter network including resistor R47 and capacitor C41, whose values are, e.g., 12Ω and 0.54 µF, respectively, is coupled between an output and the inverting input of the amplifier U13. The output of the amplifier U13 is coupled to pin 7 of the microcontroller U5 via a filter network that includes a resistor R49 and a capacitor C43, whose values are, e.g., 35 kΩ and 4.7 µF, respectively. The circuit disclosed above is used to improve the dynamic range and resolution of the pressure signal. If, however, the resolution of the analog channel of the microcontroller is sufficient, the pressure signal can be inputted directly to the analog channel of the microcontroller using a protection circuit.

Alternatively, the pressure input signal may take the form of a digital signal and be provided to a serial port, communication bus, CAN bus, or LIN bus of the microcontroller U5. It should also be appreciated that the pressure input signal may take a variety of forms. For example, the pressure input signal may be provided by a brake pedal position sensor, a brake pedal pressure sensor pad, or a hydraulic brake system pressure sensor, among other such sensors. Irrespective of the sensor that provides the pressure input signal, the input signal provides an indication of the amount of braking intended, such as by using the hydraulic pressure of the hydraulic brake system of the towing vehicle, may be utilized by the microcontroller U5 in determining an appropriate brake output signal.

The brake output signal may be provided in the form of a pulse width modulated (PWM) signal with a frequency of 250 Hz and a variable duty cycle, e.g., from zero to one-hundred percent. As shown in FIG. 2B, the brake output signal is provided via high-side drivers U2 and U3, which are coupled in parallel and switched by the microcontroller U5 (via pin 12) through an NPN transistor Q7.

A resistor R23, e.g., 10 kΩ, limits the base current of transistor Q7 and a resistor R4, e.g., 10 kΩ, pulls the collector of the transistor Q7 to the vehicle battery VBATT (provided via connector P1, pin A) when the transistor Q7 is turned off. The collector of the transistor Q7 is also coupled, through a current limiting resistor R5, e.g., 10 kΩ, to a gate (pin 2) of high-side drivers U2 and U3. A drain (pin 3) of the drivers U2 and U3 is coupled to VBATT and a source (pin 5) of the drivers U2 and U3 is coupled to the brakes 114 (FIG. 1) of the towed vehicle. When the transistor Q7 is turned on by the microcontroller U5, the drivers U2 and U3 are shut-off and a brake output signal is not provided to the brakes. When the microcontroller U5 turns the transistor Q7 off, the drivers U2 and U3 are turned on and a brake output signal is provided to the brakes 114 of the towed vehicle.

A suitable high-side driver is manufactured and made commercially available by ST Microelectronics (part no. VN920). The VN920 is a single channel high-side solid-state relay intended for driving any kind of load with one side connected to ground. The VN920 incorporates an internal charge pump that provides voltage to drive the gate of an internal n-channel MOSFET to a voltage higher than VBATT. This eliminates the external charge-pump circuitry normally needed to drive an n-channel MOSFET. The VN920 also permits a one hundred percent duty cycle as a minimum off-time is not required to recharge a charge-pump capacitor.

The drivers U2 and U3 include a built-in current-sense circuit that produces a current from the sense pin (pin 4) that is proportional to the current delivered to the load by the drivers U2 and U3. This current sense output is monitored by the microcontroller U5 (pins 4 and 20) via a filter network including a sense resistor R10, a resistor R3, and a capacitor C11, whose values are, e.g., 470Ω, 10 kΩ and 3300 pF, respectively. This allows the microcontroller U5 to measure the current delivered to the load as well as determine whether a current overload condition exists with the brakes.

The microcontroller U5 also monitors the voltage across capacitor C5, via pin 5, to determine whether an open ground or short exists. The voltage across capacitor C5 is divided by resistors R7, e.g., 47 kΩ, and R13, e.g., 10 kΩ, before being provided to the microcontroller U5, such that the maximum input voltage to the microcontroller U5 is not exceeded.

Anytime the output is pulsed, current is delivered to the electromagnets building up energy in the magnetic field. When the pulse ends, the current will continue to flow and charge capacitor C5. The voltage across capacitor C5, therefore, rises above that of the vehicle battery VBATT. If pulsing continues, the circuit can be damaged by excess voltage. Therefore, when the voltage rises above a preset value, e.g., 18 volts, the microcontroller U5 is programmed to determine that the brakes 114 are not operating properly and provides status information to an operator of the vehicle, via display DS1. When the voltage falls below a preset value, e.g., 8 volts, the microcontroller U5 is programmed to determine that the brakes 114 are shorted and provide status information to an operator of the vehicle via display DS1. The microcontroller U5 is programmed to provide appropriate information to an operator of the vehicle, via the display DS1, by illuminating an appropriate segment or segments and/or indicators of the seven-segment displays. A suitable display is manufactured and made commercially available by FEMA (part no. DA20)

According to another embodiment of the present invention, the microcontroller U5 is programmed to automatically set at least one of a gain level and a boost level for the brake control unit 200. The microcontroller U5 determines an appropriate gain level and/or boost level for the brake control unit 200 by performing a number of programmed tasks. Initially, the microcontroller U5 causes a brake output signal to be provided to the brakes of a towed vehicle when a brake pedal of a towing vehicle is depressed and before the brakes of the towing vehicle can respond to the depression of the brake pedal. The microcontroller U5 is also programmed to detect a deceleration of the towed vehicle attributable to the brake output signal.

The detected deceleration provides an indication of towed vehicle characteristics, such as brake temperature, brake pad wear, proximity of brake pads to the brake drum, brake magnet strength, brake spring strength, brake pad moisture, battery voltage, number of axles, load of towed vehicle, weight distribution of towed vehicle, tire conditions of tires of the towed vehicle, speed, etc. It also provides an indication of the road conditions. It should be appreciated that a brake control unit that is capable of automatically setting a gain level and/or a boost level does not require the potentiometer V2 or the boost switch SW1 and its associated components, e.g., resistor R18 and capacitor C12 (see FIG. 2A). For example, if the speed signal of the towed vehicle is about zero (meaning that the wheels of the towed vehicle are locked), the brake output signal is substantially equal to the reduced gain setting. This means that the brake output signal corresponds to a maximum brake output signal that can be applied to the brakes of the towed vehicles based on the towed vehicle characteristics. This reduced gain setting will continue to apply the reduced power to the brake load until such gain setting is modified. Finally, the gain setting reduces power to the brake load irrespective of the pressure signals received.

It should be appreciated that even during rapid depression of a towing vehicle brake pedal there is a period of latency before hydraulic brakes of the towing vehicle are actually applied. Thus, if brakes of a towed vehicle are quickly ramped up after sensing a stoplight signal and before the hydraulic brakes of the towing vehicle can respond a "tug" that is a result of the towed vehicle brake initiation can be detected. This "tug" provides an indication of the onset of towed vehicle braking and can be utilized to determine a desired boost level. This obviates the need for a separate boost switch that has generally been utilized to help a towed vehicle lead a towing vehicle in braking. Thus, when the voltage ramp passes the point of onset of braking the ratio of deceleration to voltage change can be determined and utilized as a brake effectiveness coefficient. This provides a basis for automatic gain and boost control.

According to another embodiment of the present invention, a brake output signal, e.g., braking voltage, can be modulated at a given rate while deceleration is logged. This can be of particular assistance on surfaces with a low coefficient of friction and with towed vehicles having lighter loads that tend to result in locked wheels. This modulation is a low frequency modulation. It can be accomplished by sending a signal to periodically release and engage the brakes of the towed vehicle to gain better control of braking of the towed vehicle. This creates a system similar to an anti-lock brake system for the towed vehicle. Additionally, the brake control unit may also include a three-axis accelerometer. This accelerometer can be used to determine the acceleration of the towed vehicle perpendicular to direction of travel of the towed vehicle. This signal is sent to the brake control unit and the brake control unit modulates the brake output signal to periodically release and engage brakes of the towed vehicle based on the perpendicular acceleration. This can lead to a more suitable braking event for the towed vehicle.

As is discussed above, in brake control units that have a gain input, an operator of the towing vehicle can adjust the maximum magnitude, e.g., the duty cycle, of a brake output signal provided via the brake switching circuit to the brakes of a towed vehicle. Further, in brake control units that have implemented a boost switch, the operator has an additional brake output signal at the start of a braking event and can provide a variable slew rate following that. This can compensate for different towed vehicles, towed vehicle weight, or other different braking features, e.g., wet or dry road conditions. This can also allow an operator to provide a more aggressive brake setting when the brake control unit was utilized with, e.g., heavy multi-axle towed vehicles.

According to one embodiment of the present invention, when a processor of a brake control unit determines that an input signal, e.g., a speed input signal and/or a hydraulic brake pressure input signal, is not changing and a towing vehicle stoplight switch is still engaged, the processor causes the brake output signal to ramp up to a voltage that is a fixed percentage of the power control set point. This may be set by a gain potentiometer after a predetermined period of time. This allows the brake control unit to provide a brake output signal during stopped or static conditions. However, during certain conditions, such as with steady application of a brake pedal of the towing vehicle on a very smooth downhill grade, a brake control unit implementing such a ramp function may implement the ramp function while the vehicle is moving. As a speed signal provided by an automotive subsystem may provide no indication of movement.

Thus, in general, it is desirable to implement a braking control routine that is capable of determining when a ramp function is implemented while the vehicle is in motion. One such braking control routine is disclosed in U.S. Pat. No. 6,615,125, entitled BRAKE CONTROL UNIT, which is hereby incorporated herein by reference in its entirety. This braking control routine determines if the ramp function is activated when the vehicle is in motion and acts to terminate the ramp function in such a case. In the present case, towed vehicle motion may be detected by evaluating whether acceleration or deceleration is taking place by, e.g., monitoring a speed input. By implementing a timer/counter or a time delay routine, the microcontroller U5 can determine whether the timer has exceeded a wait value. This is implemented to provide an indication that the towing vehicle is, in fact, stopped. If the timer/counter has exceeded the wait value, e.g., 4 seconds, the microcontroller U5 activates the ramp function as described above. When the microcontroller U5 determines a deceleration exceeds a deceleration threshold the ramp function is terminated as this indicates that the towing vehicle is in motion.

According to another embodiment of the present invention, an automatic boost and/or gain routine can be implemented by providing a brake output signal to brakes of a towed vehicle while the towed vehicle is in motion. In implementing an automatic boost and/or gain routine, the microcontroller U5 determines whether a brake pedal of a towing vehicle is depressed. This is done in a matter similar to that described with respect to FIGS. 2A and 2B above. If the brake pedal of the towing vehicle is depressed, the microcontroller U5 causes a brake output signal to be provided to brakes of the towed vehicle. Next, the microcontroller U5 detects deceleration of the towed vehicle that is attributable to application of the known brake output signal. In this manner, the microcontroller U5 can determine the relationship between the detected deceleration and the known brake output signal. The deceleration of the towed vehicle, with respect to a given brake output signal, provides an indication of the towed vehicle characteristics such as The detected deceleration provides an indication of towed vehicle characteristics, such as brake temperature, brake pad wear, proximity of brake pads to the brake drum, brake magnet strength, brake spring strength, brake pad moisture, battery voltage, number of axles, load of towed vehicle, weight distribution of towed vehicle, tire conditions of tires of the towed vehicle, speed, etc. It also provides an indication of the road conditions. Thus, the ratio of the deceleration to the brake output signal can be associated with an appropriate value in, e.g., a look-up table that is utilized by the microcontroller U5 to determine an appropriate boost level and/or gain level for the brake control unit.

According to another embodiment of the present invention, the microcontroller U5 may be programmed to automatically control braking of a towed vehicle responsive to multiple inputs. For example, the microcontroller U5 may receive speed signals that are indicative of a speed of at least one of a towing vehicle and a towed vehicle, and a brake signal that is indicative of a hydraulic pressure of a hydraulic brake system of the towing vehicle. The microcontroller U5 then responds by applying a brake output signal whose magnitude is based on both the speed and the brake signal to brakes of the towed vehicle.

An exemplary algorithm for implementing such a program is set forth below:

$$VOUT = f1(VBP) * f2(SPEED) * TBC * f3(GAIN)$$

where VOUT is the magnitude of the brake output signal, e.g., between zero and twelve volts; TBC is 1 if the towed vehicle brakes are sensed and 0 if the towed vehicle brakes are not sensed; GAIN is greater than zero and less than or equal to one; VBP is a scaled value of the hydraulic brake pressure signal, e.g., between zero and five volts; and SPEED is a scaled value of the speed signal provided by a sensor located in the towing/towed vehicle. It should be understood, however, that this algorithm is merely an exemplary embodiment and that other algorithms are contemplated herein.

In another embodiment, the microcontroller U5 is also programmed to determine a relationship between the speed and a speed threshold. The microcontroller U5 is programmed to modify the brake output signal to provide less power to the brakes as a function of the speed when the speed is below the speed threshold, e.g., 25 kilometers/h. In another embodiment, the microcontroller U5 is programmed to modify the brake output signal to provide power to the brakes as a function the pressure. In yet another embodiment, the microcontroller U5 is programmed to modify the brake output signal to provide power to the brakes as a function of the speed and as a function of the pressure.

Figure 3:
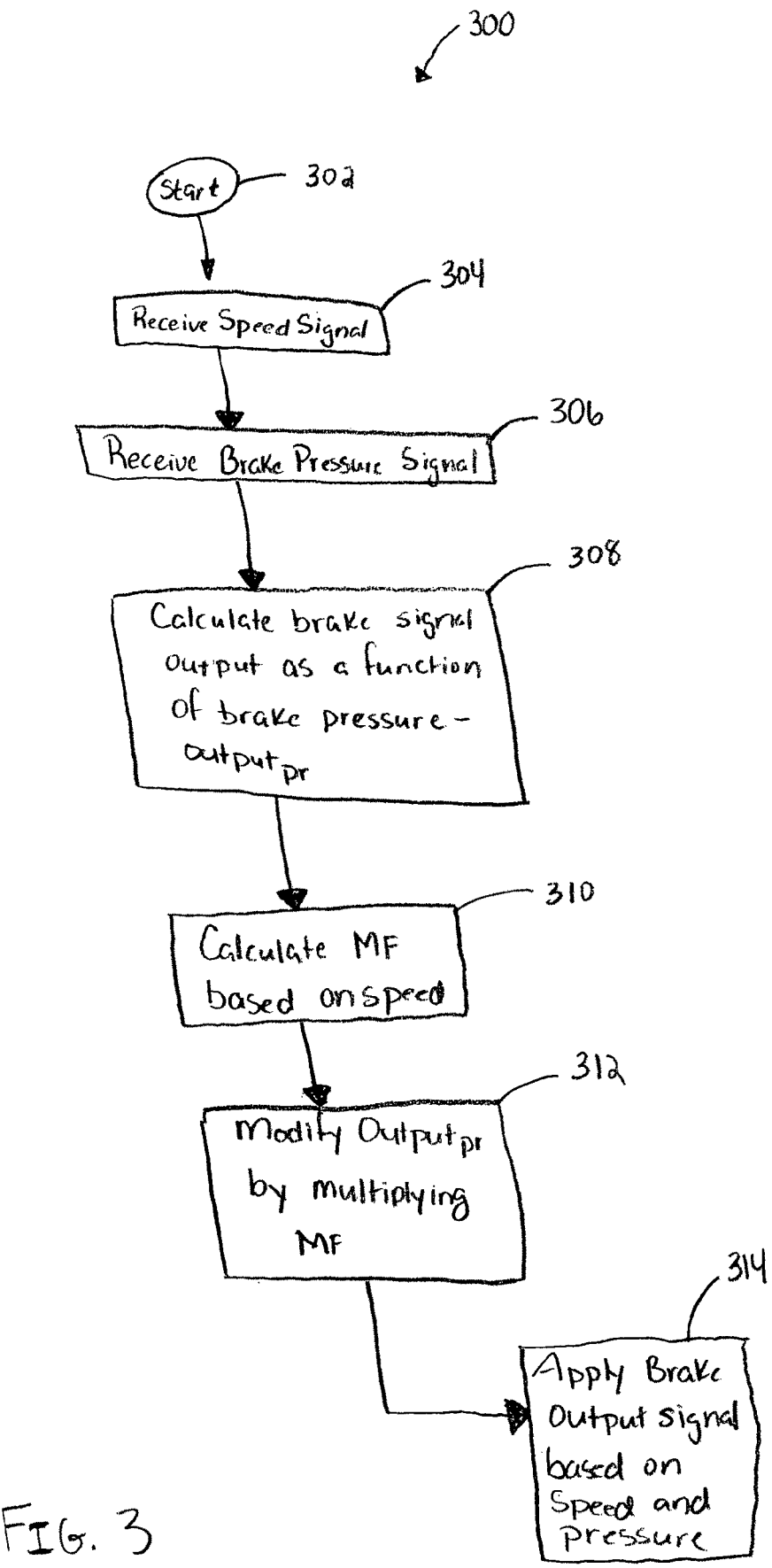
FIG. 3 is a flowchart of an exemplary threshold routine, according to an embodiment of the present invention.

With reference to FIG. 3, a threshold routine 300 is initiated at step 302. At step 304 the microcontroller U5 receives a speed signal from, e.g., a GPS receiver. Next, in step 306 the microcontroller U5 receives a pressure signal from, e.g., a hydraulic brake system pressure sensor. As the brake signal output is a function of both the brake pressure and the towing vehicle speed, the brake signal output is first calculated as a function of the brake pressure. Accordingly, at step 308 the microcontroller U5 calculates the brake output signal as a function of the brake pressure, which is OUTPUTpr. OUTPUTpr is a substantially non-linear or piecewise linear function of the brake pressure. Next, at step 310, the microcontroller U5 calculates a multiplying factor (MF) based on the speed signal. The MF is less than 1. Then, at step 312 the microcontroller U5 modifies the OUTPUTpr by multiplying it with MF. This results in the appropriate brake output signal, which is applied to the brakes of the towed vehicle at step 314. It should be noted that MF is a substantially non-linear or piecewise linear function of the speed. Thus, in general, VOUT=f1(brake pressure)*f2(speed), where f1 and f2 are substantially non-linear or piecewise linear functions.

It should be appreciated that the speed signals may be provided by various sources, e.g., a global positioning system (GPS) receiver, a wheel speed sensor, an engine speed sensor, a throttle position sensor and a Doppler sensor. Such sources may be interfaced with the microcontroller via analog channel, CAN bus, LIN bus, or serial communication.

According to yet another embodiment, the microcontroller is programmed to determine an actual deceleration of the towed vehicle based upon the speed signals and determine a towed vehicle characteristic, based upon the actual deceleration of the towed vehicle. Alternatively, the actual deceleration of the towed vehicle may be determined using a deceleromter interfaced with microcontroller. Regardless of the method used, the microcontroller U5 then causes the brake output signal to be adjusted to achieve a desired deceleration for the towed vehicle. The towed vehicle characteristic may include, without limitation, brake temperature, brake pad wear, proximity of brake pads to the brake drum, brake magnet strength, brake spring strength, brake pad moisture, battery voltage, number of axles, load of towed vehicle, weight distribution of towed vehicle, tire conditions of tires of the towed vehicle, speed, etc. It also provides an indication of the road conditions.

According to another embodiment, the microcontroller U5 is programmed to periodically receive speed signals that are indicative of a speed of a towing vehicle and/or a towed vehicle. The microcontroller U5 is further programmed to increase power supplied by a variable brake output signal to the brakes of the towed vehicle until a preset threshold deceleration, e.g., −2 m/s2 is achieved for the towed vehicle. Next, the microcontroller U5 determines a braking power at which the preset threshold deceleration is achieved. The microcontroller U5 also determines a towed vehicle characteristic based on both the speed signal and a known braking time in which the preset threshold deceleration is achieved. For example, if the change in deceleration compared with the change of time is above a certain threshold, e.g., 25 kilometers per hour, the microcontroller U5 can determine the status of the brakes, e.g., are they heated and/or are they aligned properly.

According to still another embodiment, the microcontroller U5 is programmed to periodically receive speed signals that are indicative of a speed of a towing vehicle and/or a towed vehicle. The microcontroller U5 is further programmed to provide a brake output signal to brakes of the towed vehicle. In this manner, the microcontroller U5 can estimate driving conditions as seen by the towed vehicle based on changes in the received speed signals attributable to the brake output signal. In response to the estimated driving conditions the microcontroller U5 then creates a second, real-time brake output signal to compensate for variations in brakes of the towed vehicle that are attributable to a current speed of the towed vehicle. The microcontroller may estimate driving conditions by determining a braking effectiveness for the towed vehicle braking based on a reduction in value of the received speed signals. It then adjusts a pulse width of the brake output signal based upon the effectiveness of the towed vehicle braking. In this manner, the microcontroller U5 provides a real-time brake output signal further modified by the previous output signal that also compensates for variable towed vehicle characteristics. Additionally, the microcontroller U5 can assess and compensate for the load of the towed vehicle and the current road condition even when no braking event is occurring so long as too much power is not sent.

According to yet another embodiment, the microcontroller U5 is programmed to receive speed signals indicative of a speed of a towing vehicle and/or a towed vehicle and apply a brake output signal to brakes of the towed vehicle. The microcontroller U5 then determines an actual deceleration of the towed vehicle attributable to the brake output signal and based upon the received speed signals. The microcontroller U5 then determines a towed vehicle characteristic based on the actual deceleration of the towed vehicle.

According to another embodiment, the microcontroller U5 is programmed to determine a speed of a towing vehicle and/or a towed vehicle, determine a pressure of a hydraulic brake system of the towing vehicle, and apply a brake output signal to brakes of the towed vehicle. In this embodiment, power provided to the brakes by the brake output signal is a function of the speed and the hydraulic pressure. In a related embodiment the microcontroller U5 also determines a relationship of the speed of the towing vehicle and a speed threshold and modifies the brake output signal to provide less power to the brakes as a function of the speed when the speed is below the speed threshold. In addition, the microcontroller U5 modifies the brake output signal to provide power to the brakes as a function of the pressure.

In another different embodiment, the microcontroller U5 periodically receives speed signals that are indicative of a speed of a towing vehicle and/or a towed vehicle. The microcontroller U5 also causes a brake output signal to be provided to brakes of the towed vehicle. The microcontroller U5 then determines an actual deceleration of the towed vehicle attributable to the brake output signal based upon a change in the speed of the towing vehicle or by using a deceleration signal from an accelerometer. The microcontroller U5 uses the actual deceleration of the towed vehicle to estimate towing conditions seen by the towed vehicle. The microcontroller U5 then determines a pressure of a hydraulic brake system of the towing vehicle and the real-time brake output signal is further modified based on the estimated driving conditions, the hydraulic pressure, and current speed of the towed vehicle.

Modification of the invention will occur to those skilled in the art and to those who make or use the invention, including, without limitation, the values provided for the various elements disclosed above. It should be understood that such values are exemplary values and the present invention is not limited to those values. Therefore, it is understood that the embodiments shown in the drawings and described above are merely for illustrative purposes and not intended to limit the scope of the invention, which is defined by the following claims as interpreted according to the principles of patent law, including the Doctrine of Equivalents.

The invention claimed is:

1. A method of controlling braking of a towed vehicle, the method comprising:
   receiving a speed signal based on a speed of at least one of a towing vehicle and a towed vehicle;
   sending a brake output signal based the speed signal to brakes of the towed vehicle to provide power to the brakes;
   determining a relationship between the speed of at least one of a towing vehicle and a towed vehicle and a speed threshold;
   applying a function to modify the brake output signal only when the speed of at least one of the towing vehicle and the towed vehicle is below the speed threshold, wherein the function modifies the brake output signal based on the speed of at least one of the towing vehicle and the towed vehicle; and
   wherein the brake output signal is not modified based on the speed of at least one of the towing vehicle and the towed vehicle when the speed of at least one of the towing vehicle and the towed vehicle is above the speed threshold.

2. A method of controlling braking of a towed vehicle, the method comprising:
   receiving an input signal based on a pressure in a brake system of a towing vehicle;
   generating a brake output signal based on the input signal;
   sending the brake output signal to brakes of the towed vehicle to provide power to the brakes;
   applying the brakes of the towed vehicle based on the brake output signal;
   receiving a speed signal based on a speed of at least one of the towing vehicle and the towed vehicle;
   determining a relationship between the speed of at least one of the towing vehicle and the towed vehicle and a speed threshold;
   applying a function to modify the brake output signal only when the speed of the towing vehicle is below the speed threshold;
   wherein the function modifies the brake output signal based on the input signal; and
   wherein the brake output signal is not modified based on the speed of the towing vehicle when the speed of the towing vehicle is above the speed threshold.

3. A method of controlling braking of a towed vehicle comprising:
   receiving a speed signal based on a speed of a towing vehicle, or a towed vehicle, or both the towing vehicle and the towed vehicle;
   generating a brake output signal based on the received speed signals, the brake output signal configured to be sent to brakes of the towed vehicle;
   determining an actual deceleration of the towed vehicle attributable to the brake output signal; and
   determining characteristics of the towed vehicle based upon the actual deceleration of the towed vehicle.

4. The method of claim 3, further comprising:
   determining relationship of the speed of the towing vehicle and a speed threshold; and
   modifying the brake output signal to provide less power to the brakes of the towed vehicle as a function of speed when the speed of a towing vehicle, or a towed vehicle, or both the towing vehicle and the towed vehicle is below the speed threshold.

5. The method of claim 4, further comprising:
   receiving pressure signals based on a pressure of a hydraulic brake system of the towing vehicle; and
   modifying the brake output signal to provide power to the brakes of the towed vehicle as a function of pressure.

6. A method of controlling braking of a towed vehicle, the method comprising:
   determining a deceleration of at least one of a towing vehicle, or a towed vehicle, or both the towing vehicle and the towed vehicle;
   determining characteristics of the towed vehicle based upon the deceleration of the towed vehicle; and
   modulating a brake output signal to periodically release and engage brakes of the towed vehicle, wherein the brake output signal is based on the characteristics of the towed vehicle.

7. The method of claim 6 further comprising:
   determining the speed of the towing vehicle or the towed vehicle or both the towing vehicle and the towed vehicle; and
   modulating the brake output signal to periodically release and engage the brakes of the towed vehicle, wherein the brake output signal is based at least in part on the speed of the towing vehicle or the towed vehicle or both the towing vehicle and the towed vehicle.

8. The method of claim 7, wherein the speed of the towing vehicle or the towed vehicle or both the towing vehicle and the towed vehicle is determined based on at least one of a global positioning system receiver, a wheel speed sensor, an engine speed sensor, a throttle position sensor, and a Doppler sensor.

9. The method of claim 6, further comprising:
   determining a hydraulic pressure of a hydraulic brake system of the towing vehicle; and
   modulating the brake output signal to periodically release and engage the brakes of the towed vehicle, wherein the brake output signal is based at least in part on the pressure of the hydraulic brake system of the towing vehicle.

10. The method of claim 9, wherein the hydraulic pressure is determined based on at least one of a hydraulic pressure sensor, a brake pedal sensor, a brake pad sensor, and a signal from a communications bus.

11. A method of controlling braking of a towed vehicle, the method comprising:
    determining a lateral acceleration of a towed vehicle perpendicular to a longitudinal direction of travel of the towed vehicle;
    modulating a brake output signal to periodically release and engage brakes of the towed vehicle based on a perpendicular acceleration;
    determining a road condition; and
    modulating the brake output signal to periodically release and engage the brakes of the towed vehicle based on the road condition.

12. The method of claim 11 further comprising:
determining a vehicle characteristic of the towed vehicle; and
modulating the brake output signal to periodically release and engage the brakes of the towed vehicle based the vehicle characteristic.

13. The method of claim 12, wherein the vehicle characteristic is one of a brake temperature of the towed vehicle, brake pad wear of the towed vehicle, proximity of brake pads to brake drum of the towed vehicle, brake magnet strength of the towed vehicle, brake spring strength of the towed vehicle, brake pad moisture of the towed vehicle, battery voltage of the towed vehicle, number of axles of the towed vehicle, load of the towed vehicle, weight distribution of the towed vehicle, tire conditions of tires of the towed vehicle, speed of the towed vehicle and road conditions as experienced by the towed vehicle.

14. The method of claim 11 further comprising
determining the speed of the towing vehicle or the towed vehicle or both the towing vehicle and the towed vehicle; and
modulating the brake output signal to periodically release and engage the brakes of the towed vehicle based at least in part on the speed of the towing vehicle or the towed vehicle or both the towing vehicle and the towed vehicle.

15. The method of claim 14, wherein the speed of the towing vehicle or the towed vehicle or both the towing vehicle and the towed vehicle is determined based on at least one of a global positioning system receiver, a wheel speed sensor, an engine speed sensor, a throttle position sensor, a Doppler sensor, and signal a communications bus.

16. The method of claim 11 further comprising:
determining a hydraulic pressure of a hydraulic brake system of the towing vehicle; and
modulating the brake output signal to periodically release and engage the brakes of the towed vehicle, wherein the brake output signal is based at least in part on the pressure of the hydraulic brake system of the towing vehicle.

17. The method of claim 16, wherein the hydraulic pressure is determined based on at least one of a hydraulic pressure sensor, a brake pedal sensor, a brake pad sensor, and a signal from a communications bus.

18. A method for controlling braking of a towed vehicle, the method comprising:
receiving a deceleration signal based on a deceleration of a towing vehicle, or a towed vehicle, or both the towing vehicle and the towed vehicle;
increasing a braking power supplied by a brake output signal to brakes of the towed vehicle until a preset threshold deceleration is achieved for the towed vehicle;
determining a braking power to brakes of the towed vehicle at which the preset threshold deceleration is achieved; and
determining characteristics of the towed vehicle based on the deceleration of the towed vehicle.

19. The method of claim 18 further comprising
determining the speed of the towing vehicle or the towed vehicle or both the towing vehicle and the towed vehicle; and
modulating the brake output signal to periodically release and engage the brakes of the towed vehicle based at least in part on the speed of the towing vehicle or the towed vehicle or both the towing vehicle and the towed vehicle.

20. The method of claim 19, wherein the speed is determined based on at least one of a global positioning system receiver, a wheel speed sensor, an engine speed sensor, a throttle position sensor, a Doppler sensor, and signal a communications bus.

* * * * *